United States Patent [19]
Nottingham

[11] 3,963,969
[45] June 15, 1976

[54] APPARATUS FOR WASHING AND WIPING VEHICLE WINDSCREENS AND HEADLAMPS

[75] Inventor: Harry Nottingham, Crewe, England

[73] Assignee: Rolls-Royce Motors Limited, Crewe, England

[22] Filed: Feb. 25, 1975

[21] Appl. No.: 553,064

[30] Foreign Application Priority Data
Mar. 16, 1974 United Kingdom............... 11766/74

[52] U.S. Cl............................ 318/443; 318/DIG. 2; 15/250 A; 15/250.02
[51] Int. Cl.²........................................... B60S 1/50
[58] Field of Search............... 318/DIG. 2, 443, 483; 15/250, 250 A, 250.02

[56] References Cited
UNITED STATES PATENTS
| | | | |
|---|---|---|---|
| 3,500,119 | 3/1970 | Price.................................. | 15/250 A |
| 3,500,120 | 3/1970 | Schultz............................. | 15/250.02 |
| 3,641,613 | 2/1972 | Povilaitis et al.................. | 15/250.02 |

Primary Examiner—Robert K. Schaefer
Assistant Examiner—John J. Feldhaus
Attorney, Agent, or Firm—Cushman, Darby & Cushman

[57] ABSTRACT

Apparatus for washing and wiping both windscreens and headlamps of automobiles comprises windscreen washer and wiper motors, headlamp washer and wiper motors and control means. The control means includes a transistorized switching circuit whose switched state is governed by the charged state of a capacitor. This switching circuit controls, through a relay, the operation of the headlamp washer and wiper motors such that when the headlamps are switched on they are washed and wiped for a predetermined length of time and so that when the windscreen wiper and washer motors are operated, if the headlamps are on the headlamp washer and wiper motors are automatically operated too.

12 Claims, 2 Drawing Figures

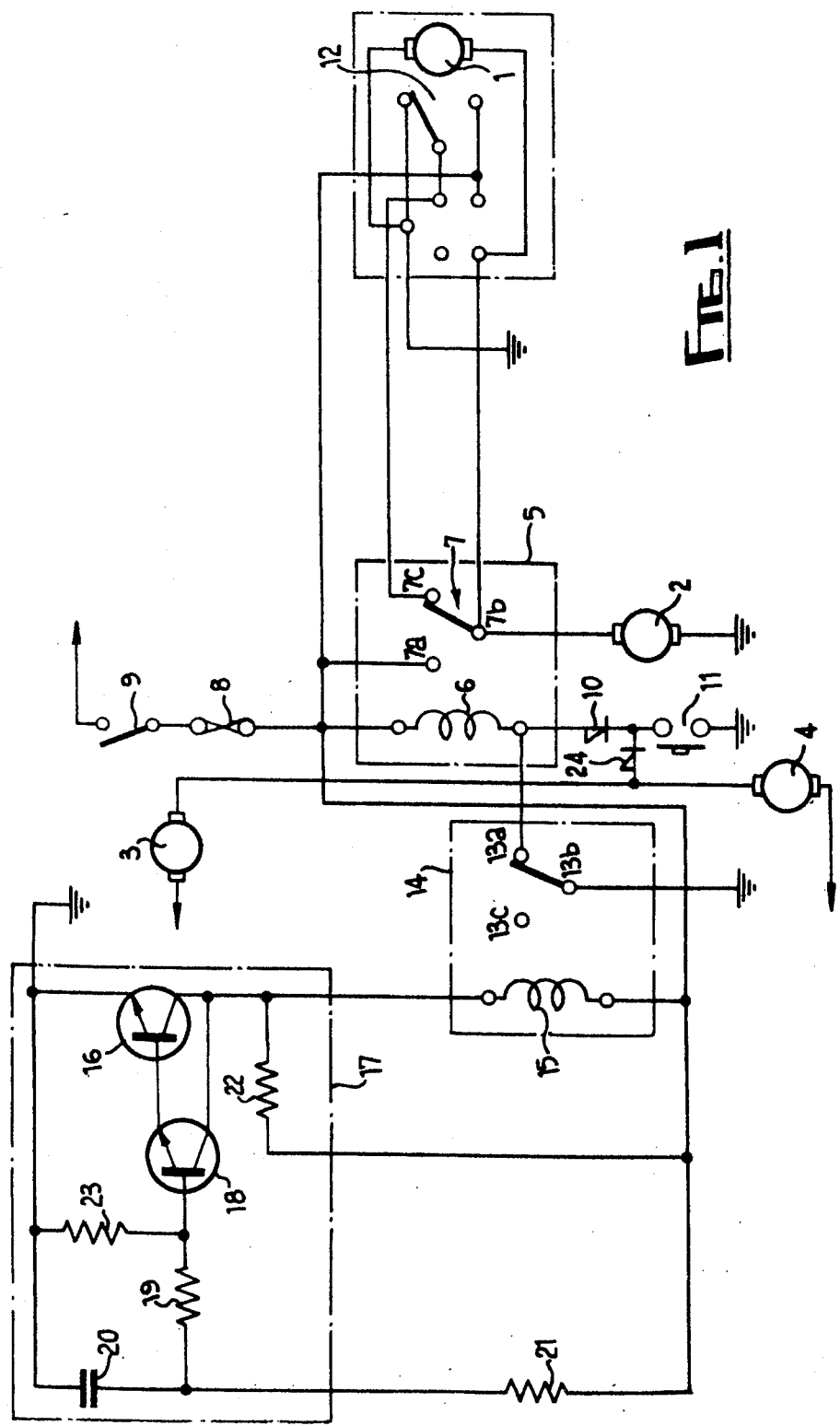

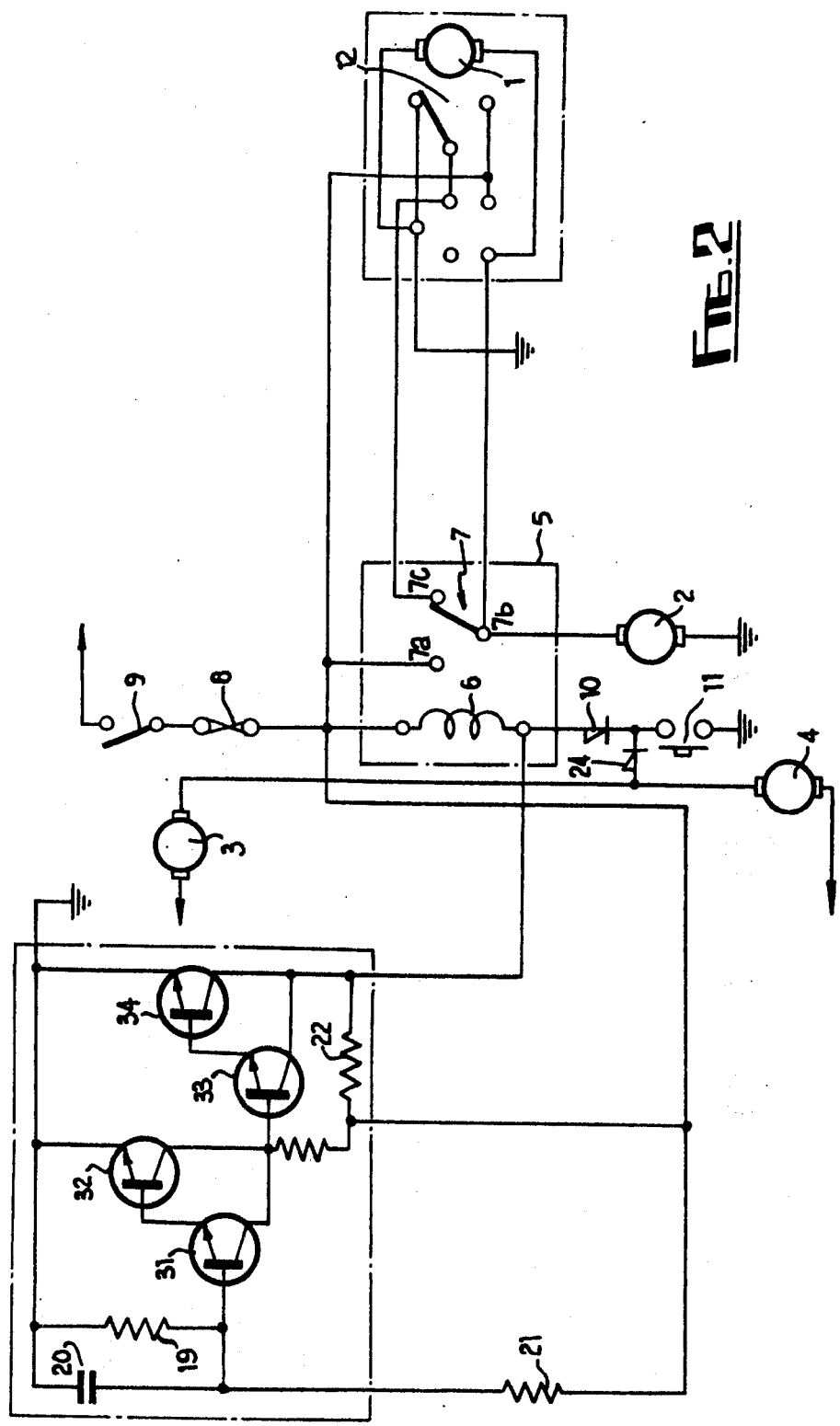

APPARATUS FOR WASHING AND WIPING VEHICLE WINDSCREENS AND HEADLAMPS

The present invention relates to apparatus for washing and wiping vehicle windscreens and headlamps.

Systems for carrying out this operation are already known. On one system the headlamp wiper motor and windscreen wiper motor are operated simultaneously; similarly the headlamp washer motor and windscreen washer motor are operated. This is unsatisfactory since headlamp wiping and washing will be required only when the headlamps are switched on and causes unnecessary wear on the headlamp wiping brush or blade and excessive use of cleaning fluid.

Another system uses a separate switch for the headlamp wiping and washing system thereby giving the driver a degree of selectivity. However this means an extra switch and since the headlamp wiping action is not easily observable it may inadvertently be left switched on.

A further system uses separate switches in which the headlamp wiper motor is supplied via the windscreen wiper switch and the headlamp washer motor is supplied via the windscreen washer switch. This again necessitates an additional switch but does give a reminder that the headlamp wiping and washing system may be in operation.

According to the present invention, there is provided apparatus for washing and wiping vehicle windscreens and headlamps comprising first supply means for supplying cleaning fluid to the windscreen, second supply means for supplying cleaning fluid to the headlamp, first driving means for driving a wiping element for the windscreen, second driving means for driving a wiping element for the headlamp, and control means operative automatically to actuate the second supply means and the second driving means when the headlamp is initially switched on and to deactuate them after a predetermined time and operative to actuate the first and second supply means and the first and second drive means simultaneously when the headlamp is switched on and the first supply means and first drive means only when the headlamp is switched off.

In a preferred embodiment the first and second supply means and the first and second drive means are electric motors.

Advantageously, the control means incorporate a delay circuit which is self activated after the predetermined time. In one embodiment the timing element of the delay circuit is a capacitor and this preferably controls the switched state of one or more transistors. The control means may incorporate a relay, the coil of which is fed through the headlamp switch and the delay circuit and the contacts of which control the actuation of the headlamp washing and wiping motors.

In order that the invention may be more clearly understood, two embodiments of the invention will now be described, by way of example, with reference to the accompanying drawings in which:

FIG. 1 shows a circuit diagram for a first form of vehicle windscreen and headlamp washing and wiping apparatus, and FIG. 2 shows a circuit diagram for a second form of vehicle windscreen and headlamp washing and wiping apparatus.

Referring to FIG. 1, the apparatus basically comprises, a headlamp wiping motor 1 for driving a headlamp wiper element (not shown), a headlamp washing motor 2 for applying washing solution to the headlamp lens, a windscreen wiper motor 3 for driving a windscreen wiper element (also not shown) and a windscreen washing motor 4 for applying washing solution to the windscreen and control circuitry for controlling the various operations of these parts.

The control circuitry comprises a first relay 5 having a relay coil 6 and relay contacts 7. One end of the coil 6 is connected through a fuse 8 and switch 9 to the vehicle battery. The switch 9 operates the vehicle headlamps. The other end of the coil is connected through a diode 10 and control switch 11 to earth. The control switch may be either self cancelling or manual return to off. The relay 5 has three contacts 7a, 7b and 7c. The contact 7b is common and is connected to one terminal of the headlamp washing motor 2 and also to one terminal of the headlamp wiping motor 1, the other terminals of which are connected to earth. Contact 7c is connected to the common contact of a park/run switch 12 for the headlamp wiping motor 1 and contact 7a is connected to the fuse 8.

The earth end of the coil 6 is connected to one contact 13a of another relay 14. There are two other contacts, one 13b is connected to earth and the other 13c is unconnected. The relay coil 15 is connected between the live end of the coil 6 and the collector of an NPN transistor 16 forming part of a delay unit 17. The delay unit 17 comprises a further NPN transistor 18 whose emitter is connected to the base of transistor 16. A base resistor 19 is connected to a capacitor 20 which is in turn connected to the emitter of transistor 16 and to earth. The junction of the resistor and capacitor 19 and 20 is connected through a resistor 21 to the junction of the two relay coils 6 and 15. The coil 15 is bridged by a resistor 22 and a resistor 23 is connected between the base of transistor 18 and earth. A further diode 24 is connected between the motor 3 and switch 11.

The operation of the apparatus is as follows. With the headlamp switch open, no current can flow down through the coil 6 and the motors 1 and 2 remain inoperative even if the control switch 11 is closed. Closure of the control switch 11 will actuate the windscreen wiper and washer motors 3 and 4, however, as the switch closes a path to earth for both motors. When the headlamp switch 9 is initially closed, current flows through the coil 6 to earth via the contacts 13a, 13b. This causes the contacts 7c, 7b of the relay 5 to be broken and contacts 7a, 7b to be made as a result of which current flows via contacts 7a, 7b through the headlamp washing motor 2 to earth and, via contacts 7a, 7b through the headlamp wiping motor to earth. This headlamp washing and wiping action will continue for a time which is determined by the operation of the delay unit 17.

When the headlamp switch 9 is first switched on the capacitor 20 of this unit is discharged and both transistors 16 and 18 are switched off as a result of which no current flows through relay coil 15 and the relay remains inoperative. As the capacitor charges up via the resistor 21 the transistors 16 and 18 are switched on; current therefore flows through the coil 15 and the contacts 13a, 13b are broken and 13c, 13b made. This de-energises the relay coil 6 and the contacts of this relay return to their original position. Motors 1 and 2 continue to run being supplied with current via the run contact of the park/run switch 12 until the wiper reaches the parked position (off the headlamp lens) when the switch, which is shown in the run position, automatically returns to the park position and breaks the current feed path to the motor 1. Should the control switch be operated with the headlamps already switched on (switch 9 closed) all four motors 1 to 4 will be operated, the motors 3 and 4 by connecting them to earth through the diode 24 as previously described. Here, however, the delay unit has no effect and motors 1 and 2 will operate for as long as control switch 11 is closed. When switch 7 moves into the attitude where 7a and 7b are connected, the function of switch 12 is effectively isolated, but on switching off at switch 11 switch 7 moves back to connect 7c to 7b and the headlamp wiper motor 1 is supplied with current through the switch 12 and returns the wipers to their parked position.

Referring to FIG. 2, an arrangement similar to that shown in FIG. 1 is shown, but the relay comprising coil 15 and contact 13 is dispensed with and the delay unit comprises four NPN transistors 31 to 34. The collectors of transistors 31 and 32 are connected to each other and to the base of transistors 33. With capacitor 20 discharged transistors 33 and 34 are held on the transistor 34 providing a path to earth for current flow through the coil 6 when the headlamp switch 9 is closed. When the capacitor 20 is charged up transistors 31 and 32 are switched on, transistors 33 and 34 are switched off and current flow through the coil 6 ceases as a result of which the contacts 7 return to their initial position switching off the motors 1 and 2. Apart from this, the circuit of FIG. 2 operates in the same manner as that of FIG. 1. In both embodiments the time delay of the delay circuit may be adjusted by adjusting the value of resistor 21. This resistor may be mounted inside or outside the delay unit.

It will be appreciated that both the described embodiments provide for control of windscreen and headlamp washing and wiping by means of a single switch, and for automatic actuation of the headlamp washer and wiper when the headlamps are initially switched on. It will also be appreciated that the above embodiments have been described by way of example only and that many variations are possible without departing from the scope of the invention. For example, the NPN transistors may be replaced by PNP transistors with the associated circuitry being rearranged accordingly.

What is claimed is:

1. Apparatus for washing and wiping vehicle windscreens and headlamps comprising first supply means for supplying cleaning fluid to the windscreen, second supply means for supplying cleaning fluid to the headlamp, first driving means for driving a wiping element for the windscreen, second driving means for driving a wiping element for the headlamp, and control means operative automatically to actuate the second supply means and the second driving means when the headlamp is initially switched on and to deactuate them after a predetermined time and operative to actuate the first and second supply means and the first and second drive means simultaneously when the headlamp is switched on and the first supply means and first drive means only when the headlamp is switched off.

2. Apparatus as claimed in claim 1, in which the first and second supply means and the first and second drive means are electric motors.

3. Apparatus as claimed in claim 1, in which the control means incorporates a delay circuit which is self activated after the predetermined time.

4. Apparatus as claimed in claim 3, in which the delay circuit comprises a capacitor.

5. Apparatus as claimed in claim 4, in which the delay circuit comprises two transistors and the capacitor is connected between the emitter of one transistor and, through a resistor, the base of the other transistor whereby the switched state of the transistors is controlled by the charged state of the capacitor.

6. Apparatus as claimed in claim 5, in which the control means comprises a first relay, the coil of which is connected in series with the headlamp supply switch and the contacts of which are disposed in the supply circuit to the second supply means and second driving means.

7. Apparatus as claimed in claim 6, in which the control means comprises a second relay, the coil of which is connected in series with the emitter collector path of the first transistor and the contacts of which are connected in series with the coil of the first relay.

8. Apparatus as claimed in claim 4, in which the control means comprises four transistors connected in two pairs with the collectors of the transistors each pair connected together and the capacitor connected between the emitter of one transistor and the base of the other transistor of one pair of transistors, the collectors of that pair of transistors being connected to the base of the first of the other pair of transistors, whereby the charged state of the capacitor controls the switched state of the transistors.

9. Apparatus as claimed in claim 8, in which the control means comprises a relay coil of which is connected in series with the headlamp supply switch and the contacts of which are disposed in the supply circuit to the second supply means and second driving means, that end of the coil remote from the headlamp supply switch being connected to the collectors of the other pair of transistors.

10. Apparatus as claimed in claim 6, wherein the control means comprises a control switch connected in series with the first relay and to the first driving means and first supply means.

11. Apparatus as claimed in claim 8, wherein the control means comprises a control switch connected in series with the relay and to the first driving means and first supply means.

12. Apparatus as claimed in claim 4, in wich a variable resistor is connected in series with the capacitor to provide for adjustment of the delay period.

* * * * *